US011832102B2

(12) United States Patent
Heldt-Sheller et al.

(10) Patent No.: US 11,832,102 B2
(45) Date of Patent: *Nov. 28, 2023

(54) USER-AUTHORIZED ONBOARDING USING A PUBLIC AUTHORIZATION SERVICE

(71) Applicant: Intel Corporation, Santa Clara, CA (US)

(72) Inventors: Nathan Heldt-Sheller, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,608

(22) Filed: May 10, 2022

(65) Prior Publication Data

US 2022/0345891 A1 Oct. 27, 2022

Related U.S. Application Data

(63) Continuation of application No. 16/613,741, filed as application No. PCT/US2018/013312 on Jan. 11, 2018, now Pat. No. 11,337,070.

(60) Provisional application No. 62/521,909, filed on Jun. 19, 2017.

(51) Int. Cl.
*H04L 29/06* (2006.01)
*H04W 12/50* (2021.01)
(Continued)

(52) U.S. Cl.
CPC ......... *H04W 12/084* (2021.01); *H04W 12/06* (2013.01); *H04W 12/50* (2021.01); *H04W 12/66* (2021.01); *H04W 84/18* (2013.01)

(58) Field of Classification Search
CPC ... H04W 12/084; H04W 12/06; H04W 12/50; H04W 12/66; H04W 84/18; H04W 4/70; H04L 63/102; H04L 67/34
See application file for complete search history.

(56) References Cited

U.S. PATENT DOCUMENTS

| 11,337,070 B2 | 5/2022 | Heldt-sheller et al. |
| 2014/0189799 A1* | 7/2014 | Lu .......................... H04L 63/102 726/4 |

(Continued)

FOREIGN PATENT DOCUMENTS

| EP | 3565211 B1 * | 4/2021 | ............ H04W 12/08 |
| JP | 2009123059 A | 6/2009 | |

(Continued)

OTHER PUBLICATIONS

Silia Maksuti; Ani Bicaku; Mario Zsilak; Igor Ivkic; Bálint Péceli; Gabor Singler; Markus Tauber; Jerker Delsing; "Automated and Secure Onboarding for System of Systems"; IEEE Access; Year: Aug. 2021; vol. 9; Journal Article; Publisher: IEEE; pp. 111095-111113 (Year: 2021).*

(Continued)

*Primary Examiner* — Fatoumata Traore
*Assistant Examiner* — Courtney D Fields
(74) *Attorney, Agent, or Firm* — Schwegman Lundberg & Woessner, P.A.

(57) ABSTRACT

Various systems and methods for user-authorized onboarding of a device using a public authorization service are described herein. In an example, a 3-way authorization protocol is used to coordinate device onboarding among several Internet of Things (IoT) Fog users (e.g., devices in a common network topology or domain) with principles of least privilege. For instance, respective onboarding steps may be assigned for performance by different Fog 'owners' such as respective users and clients. Each owner may rely on a separate authorization protocol or user interaction to be notified of and to give approval for the specific onboarding actions(s) assigned. Further techniques for implementation and tracking such onboarding actions as part of an IoT network service are also disclosed.

25 Claims, 9 Drawing Sheets

(51) Int. Cl.
*H04W 12/084* (2021.01)
*H04W 12/60* (2021.01)
*H04W 12/06* (2021.01)
*H04W 12/08* (2021.01)
*H04W 12/71* (2021.01)
*H04W 12/77* (2021.01)
*H04W 84/18* (2009.01)

(56) References Cited

U.S. PATENT DOCUMENTS

| | | | |
|---|---|---|---|
| 2015/0121470 A1* | 4/2015 | Rongo | H04L 63/083 726/4 |
| 2016/0285840 A1 | 9/2016 | Smith et al. | |
| 2018/0063879 A1* | 3/2018 | Lee | H04W 76/14 |
| 2021/0176638 A1 | 6/2021 | Heldt-sheller et al. | |

FOREIGN PATENT DOCUMENTS

| | | |
|---|---|---|
| WO | WO-2015061678 A1 | 4/2015 |
| WO | WO-2018236421 A1 | 12/2018 |

OTHER PUBLICATIONS

"U.S. Appl. No. 16/613,741, Non Final Office Action dated Aug. 4, 2021", 21 pgs.

"U.S. Appl. No. 16/613,741, Notice of Allowance dated Jan. 18, 2022", 25 pgs.

"U.S. Appl. No. 16/613,741, Preliminary Amendment filed Nov. 14, 2019", 10 pgs.

"U.S. Appl. No. 16/613,741, Response filed Nov. 1, 2021 to Non Final Office Action dated Aug. 4, 2021", 14 pgs.

"International Application Serial No. PCT/US2018/013312, International Preliminary Report on Patentability dated Jan. 2, 2020", 10 pgs.

"International Application Serial No. PCT/US2018/013312, International Search Report dated Apr. 19, 2018", 6 pgs.

"International Application Serial No. PCT/US2018/013312, Written Opinion dated Apr. 19, 2018", 8 pgs.

"OCF Core Specfication V1.0.0 Part 1", Open Connectivity Foundation (OCF), (Mar. 22, 2017), 175 pgs.

"OCF Security Specification V1.0.0", Open Connectivity Foundation (OCF), [Online] Retrieved from the internet: <https://openconnectivity.org/draftspecs/OCF_Securi ty_Speci fi cati on_vl.0.0.pdf>, (Mar. 22, 2017), 104 pgs.

Banda, Gourinath, et al., "An IoT Protocol and Framework for OEMs to Make JoT-Enabled Devices forward Compatibl", 11th International Conference on Signal-Image Technology Internet-Based Systems SITIS IEEE, (Nov. 23, 2015), 824-832.

Maksuti, Silia, et al., "Automated and Secure Onboarding for System of Systems", vol. 9 | Journal Article, (Aug. 3, 2021), 111095-111113.

Nelson, Barbara, "The End of Soft AP", Cirrent https://blog.cirrent.com/the-end-of-soft-ap, (Feb. 15, 2017), 8 pgs.

* cited by examiner

USER-AUTHORIZED ONBOARDING USING A PUBLIC AUTHORIZATION SERVICE

PRIORITY APPLICATION

This application is a continuation of U.S. patent application Ser. No. 16/613,741, filed Nov. 14, 2019, which is a U.S. National Stage Application under 35 U.S.C. 371 from International Application No. PCT/US2018/013312, filed Jan. 11, 2018, published as WO 2018/236421, which claims the benefit of priority to U.S. Application Ser. No. 62/521,909, filed Jun. 19, 2017, all of which are incorporated herein by reference in their entirety.

TECHNICAL FIELD

Embodiments described herein generally relate to processing techniques used with data communications and interconnected device networks, and in particular, to techniques applied for device onboarding within Internet of Things (IoT) devices and device networks.

BACKGROUND

IoT devices are physical or virtualized objects that communicate on a network, and may include sensors, actuators, and other input/output components, to collect data or perform actions from a real-world environment. For example, IoT devices may include low-powered devices that are embedded or attached to everyday things—such as buildings, vehicles, packages, etc.—to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
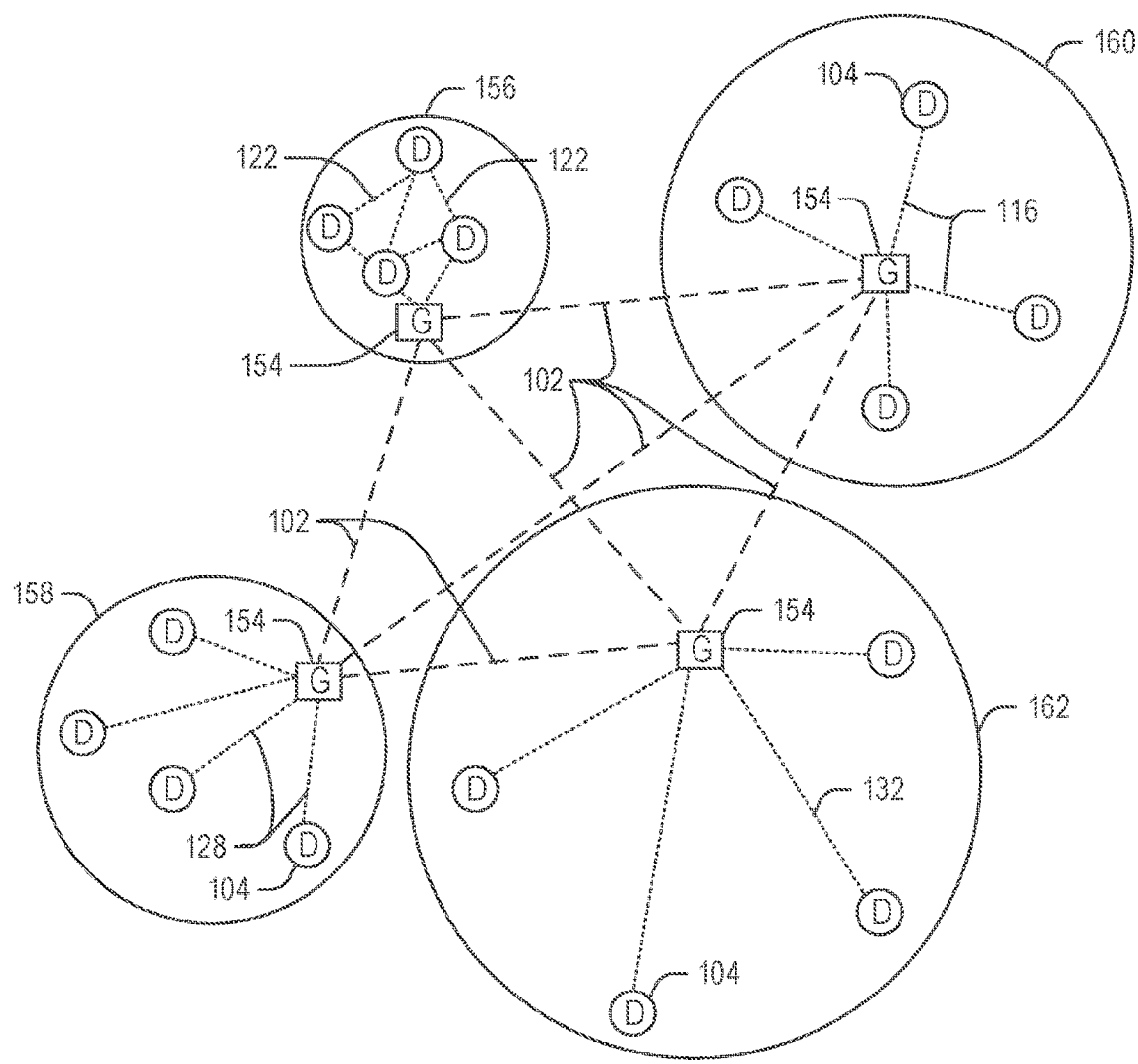
FIG. 1 illustrates a domain topology for respective internet-of-things (IoT) networks coupled through links to respective gateways, according to an example.

In the following description, methods, configurations, and related apparatuses are disclosed for device connection and operation in an IoT device interconnection setting through the use of a public authorization service. In the following techniques, separate authorizations (including through use of a 3-way authorization protocol involving an authentication service such as OAuth2) is used to coordinate device onboarding among several Fog users (e.g., devices in a common network topology) with principles of least privilege. For instance, onboarding tasks used to onboard a particular IoT device may involve a separation-of-duties between different onboarding step(s) and privileges to perform such steps; such separation-of-duties may also apply to different onboarding step(s) tasked among different devices with different privileges.

In an example, respective onboarding steps are assigned for performance by different Fog 'owners' (e.g., different users). Each owner relies on an OAuth2 (RFC 6749) user interaction to be notified of and to give approval for the specific onboarding step(s) assigned. This results in multiple clients, having a plurality of privileges, being tasked to perform their respective commissioning approvals regardless of who initiated onboarding. Such onboarding steps may be applicable to networks and systems of devices such as in implementations of Open Connectivity Foundation (OCF) standard-based networks and IoT devices (including Fog implementations, for a network of IoT devices operating as a Fog).

IoT device onboarding conventionally relies on a complex (e.g., high-touch) user experience where users often must physically interact with a new device to authorize and configure the device for onboarding. Users, however, may wish to avoid a complex experience, desiring instead to allow device installation and use onto a network by an untrusted party. The techniques discussed herein enable flexibility in the formation of a Fog network among multiple users that may have multiple, or different, web identities, while still coordinating clients with respective capabilities and privileges to effectively accomplish onboarding. With use of the present techniques, an onboarding utility may be configured to track the onboarding steps and facilitate obtaining approvals from the appropriate owner(s). Further, the present techniques discussed herein allows users to access a simple onboarding process while still maintaining security considerations.

Some conventional approaches for onboarding utilize OAuth2, such as consulting a web user to give permission to a client application to interact with a new device (commonly referred to as a "resource server"). However, this presents a problem in scenarios where the owner is expected to give full access to the resource server on behalf of the client application. Such an approach violates the security principle of least-privilege, and provides the client application with more access than is necessary.

Additionally, in some conventional scenarios, onboarding into a Fog or cloud may require multiple users (people) to coordinate the onboarding steps. However, especially in consumer environments, users often have identities with public identity providers such as Google, Facebook, Amazon, and the like. Users operating in the same Fog may use dissimilar identity providers, and therefore there is not an expectation that the identity provider will have any special insight regarding enforcing a Fog-specific onboarding policy. Rather, control is distributed across the several users in the Fog. Accordingly, a significant technical problem facing device onboarding and subsequent device administration involves coordinating onboarding among multiple users that do not share a common naming authority.

As discussed herein, the following techniques apply a series of operations for onboarding that involve the interconnection of entities including an onboarding tool, an authorization server, multiple user agents, and a new device. As a further example, the techniques discussed herein may be used with a "generalized client" that manages user authentication experience by presenting an abstract view of the IoT network through a user interface. For instance, the following approaches are usable in scenarios where a user account is maintained by a separate "service" such as a DOTS (Device Owner Transfer Service, also known as "DOXS"), whereas user authorizations are maintained on a separate "service" such as a DOTS or OAuth2 service.

As also discussed, a 3-way authorization protocol may be used to coordinate a first client to perform a first onboarding task; a second onboarding task as provided by a second client is then performed according to a similar pattern as the first onboarding action; and additionally, third, fourth, or more onboarding actions may be performed following a similar pattern as the first onboarding action, until onboarding is completed. As a result, users may still encounter a simple experience to onboard a new device, even as security considerations are maintained among respective agents and servers for each of the onboarding phases.

FIG. 1 illustrates an example domain topology for respective Internet-of-Things (IoT) networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
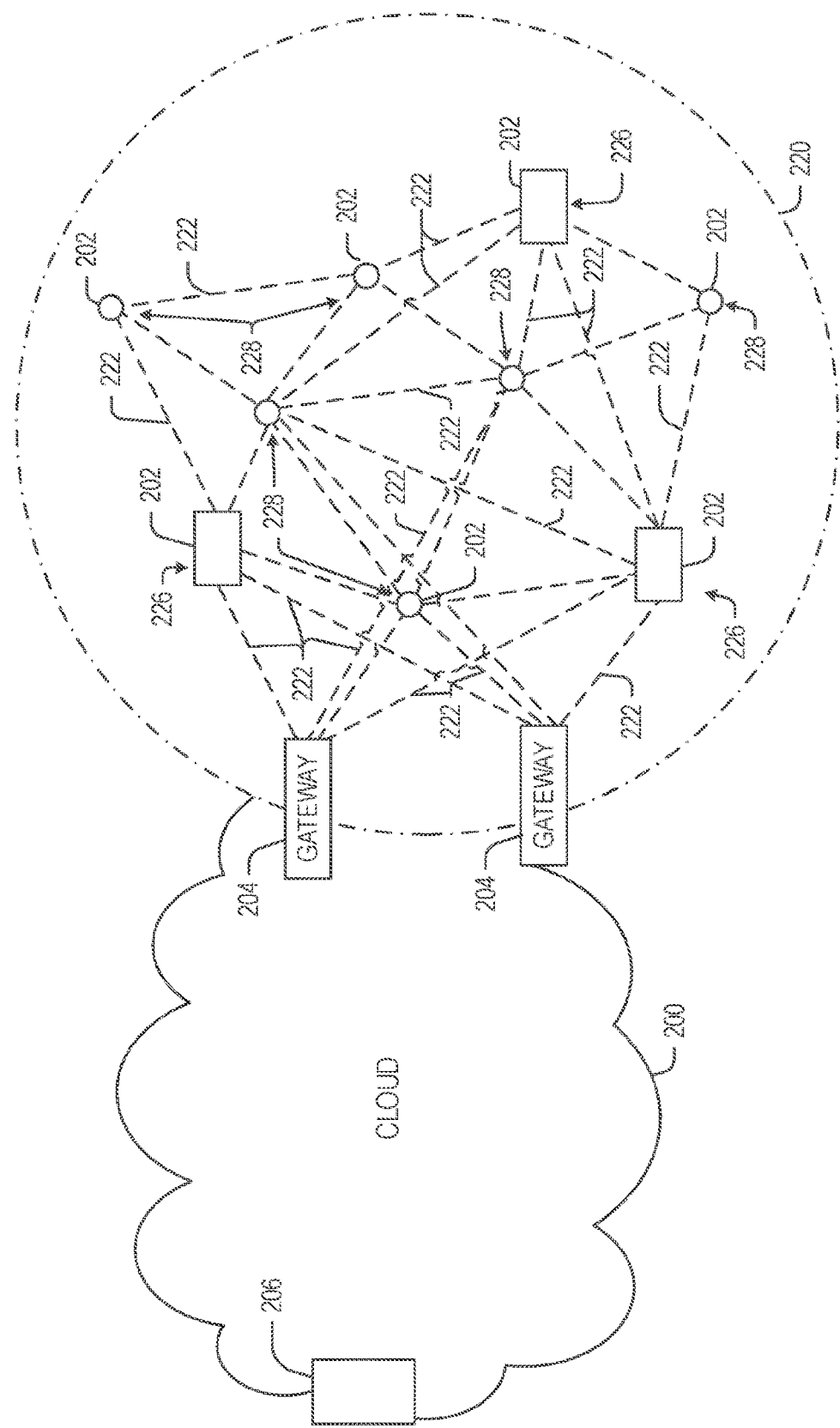
FIG. 2 illustrates a cloud computing network in communication with a mesh network of IoT devices operating as a Fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as Fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 8 and 9.

Finally, clusters of IoT devices may be equipped to communicate with other IoT devices as well as with a cloud network. This may allow the IoT devices to form an ad-hoc network between the devices, allowing them to function as a single device, which may be termed a Fog device. This configuration is discussed further with respect to FIG. 2 below.

FIG. 2 illustrates a cloud computing network in communication with a mesh network of IoT devices (devices 202) operating as a Fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a Fog device. In this example, the alerts coming from the Fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others. The fog 220 also may operate in an ambient computing approach involving many different aspects of collecting, transferring, and using information among devices. Further, the functions and techniques disclosed herein may be distributed among multiple entities of the fog 220.

In some examples, the IoT devices 202 may be configured using an imperative programming style, e.g., with each IoT device 202 having a specific function and communication partners. However, the IoT devices 202 forming the Fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

The techniques discussed herein may be applicable to these and other network configurations. In an example, device onboarding and commissioning may occur with multiple Fog or IoT networks without the first Fog needing to rescind its 'ownership' in order for a second Fog to establish 'ownership'. As a result, a device may treat each Fog or IoT network as a separate tenant.

With the presently described techniques, respective onboarding (e.g., commissioning) actions may be broken down into separate duties according to a least-privilege design. In the present least-privilege design, the collective steps of connectivity, discovery, trust establishment, service provisioning, and device configuration (in that order, or in an alternate order) may be performed by different clients, with each client having rights to perform (if needed) only one of the defined steps. Accordingly, a human user may participate in onboarding (e.g., commissioning) activities through meaningful human-computer dialog. Additionally, the user's approval does not override the separation of duties established by a least-privilege design.

Existing approaches that are currently used for device onboarding do not fully provide capable onboarding for many public access scenarios. As an example, some existing onboarding techniques utilize a 'rendezvous server', with this server operating as a third party service operated by device vendors and device users to coordinate receipt of new devices into a device Fog or network. However, the user must still login to the 'rendezvous' service using a username and password, and the client application is presumed to have full access to the device. As another example, SoftAP mechanisms allow an onboarding device to connect directly with a new device to provision it with Wi-Fi settings so that the device may be onboarded. However, the access point (AP) is presumed to have full access to the new device. As another example, ZipKey mechanisms use a button on a user device that integrates with router (e.g., AP) and ISP service to create a connection from device to cloud that is outside the user's production network. Nevertheless, the expectation is the ISP has full access and control of the 'zipkeyed' device.

Other types of existing 'pairing' and 'onboarding' approaches commonly rely on some form of out-of-band secure communication (e.g., a PIN) that authorizes the client application to take full control of the new device. These and other forms of existing approaches all require complex or high-touch interaction from the user when a device is commissioned into a network. Such existing approaches presume the user has full privileges to the device to perform any and all steps necessary to commission (e.g., onboard or provision) a device. Such existing approaches do not anticipate least-privilege scenarios where the application performing a commissioning step might be given a subset of privileges and where there may be multiple steps each requiring different (e.g., least) privileges. Finally, such existing approaches do not assume that multiple users sharing a common Fog will obtain online identities from different identity providers.

As referenced herein, an onboarding process may be divided into at least five categories or steps where each step may involve different actors (e.g., users) and exchanges of information involving different parties performing different onboarding duties. Pragmatic security principles apply a least-privilege approach to realize a separation-of-duties as it pertains to IoT device onboarding. These duties may be understood in terms of, Connectivity, Discovery, Trust Establishment, Credential Provisioning, ACL Provisioning, and other setup actions.

Figure 3:
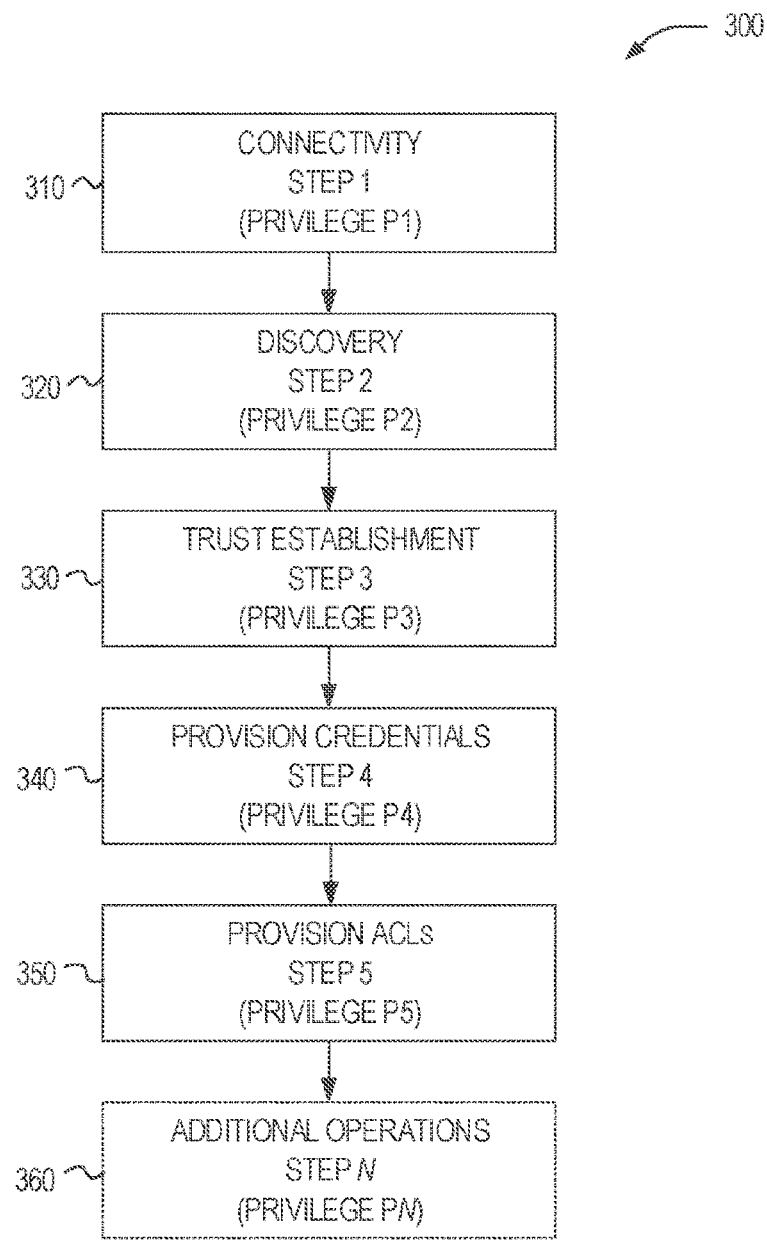
FIG. 3 illustrates a flowchart illustrating separation of privileges associated with respective onboarding operations performed in an onboarding process, according to an example.

FIG. 3 illustrates a flowchart 300 illustrating an example separation of privileges associated with respective onboarding operations 310-360 performed in an onboarding process. Specifically, operations 310-360 illustrate a sequence of operations, performed in combination, that enable onboarding. Various operations correlate to separate actions (e.g., connectivity, discovery, trust establishment, providing credentials, provisioning ACLs, and other additional or alternate steps) that are performed as part of the onboarding process. Each of these operations may have separate privileges associated with them, such as in cases where some client devices are privileged to perform some operations (e.g., to help establish server device connectivity) but not others (e.g., to assist trust establishment).

Figure 4:
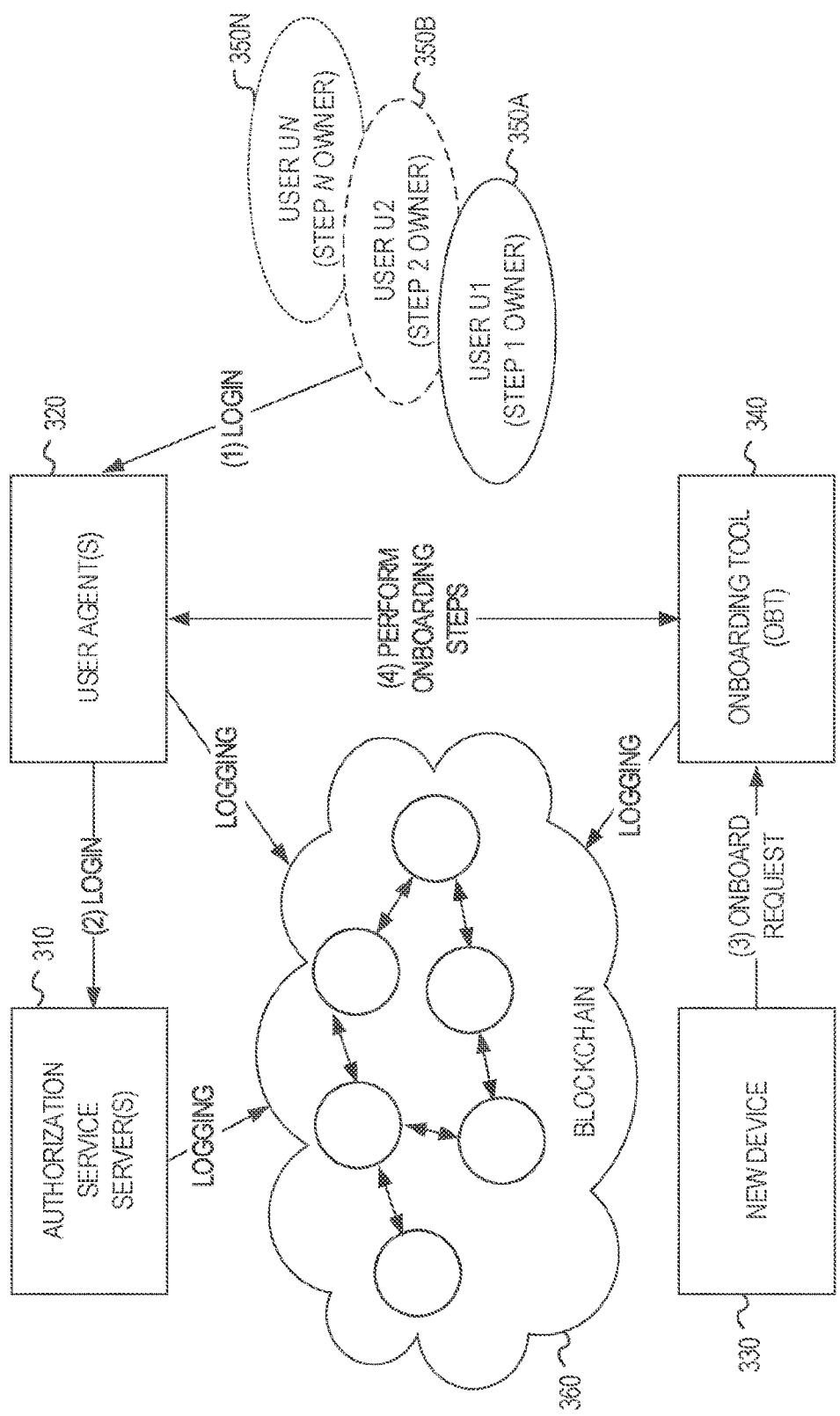
FIG. 4 illustrates a diagram of a system overview for an onboarding process, according to an example.

FIG. 4 illustrates a diagram of an example system overview for an onboarding process. The Onboarding process involves an orchestration between an Onboarding Tool (OBT) 340 (e.g., operating as an onboarding client) that knows the onboarding steps and discovers new Device(s) (e.g., new device 330, operating as a resource server) that are available for onboarding. The OBT 340 is not authorized to perform onboarding steps independently, but may interact with an OAuth2, OpenID-Connect, Kerberos or other dynamic single-sign-on (SSO) infrastructure where one or more User Agents 320 track user logins with a public Authorization Service (AS) 310 (e.g., hosted by one or more authorization servers).

In an example, the AS 310 tracks user authorization responses on behalf of the respective User (e.g., one of the users 350) for the OBT 340. This user authorization information is stored and maintained by the AS 310 for subsequent onboarding operations. Then, when a new device 330 is available for onboarding (and in some examples, when the new device 330 requests onboarding), the OBT 340 performs the onboarding actions (e.g., as part of the action sequence depicted in FIG. 3). In a further example, a Blockchain 360 (e.g. Bitcoin, Ethereum, Gem, Hyperledger, Bitnation, and the like) or other distributed ledger may be used to perform logging, to keep track of behaviors of the various entities, e.g., the AS 310, OBT 340 and UA 320. If misfeasance occurs, the Blockchain 360 will have a record of the behavior that any of the Users 350 (U1-Un) may access to detect improper behavior.

A 3-way authorization protocol, involving the use of an authentication framework such as OAuth2, Kerberos, OpenID-Connect, or the like, may be employed in a scenario where a human user (optionally) is associated with a particular step of an IoT onboarding process. In this example, the human user may supply oversight/approval without interference from an unauthorized approver. This 3-way authorization protocol may involve an exchange of 6 messages (the six transactions further depicted in FIG. 5) that coordinates approval for a client (e.g., a first client C1) having capabilities and a specific privilege (e.g., a first privilege P1) to perform a specific step (e.g., a first step) of an onboarding process.

Figure 5:
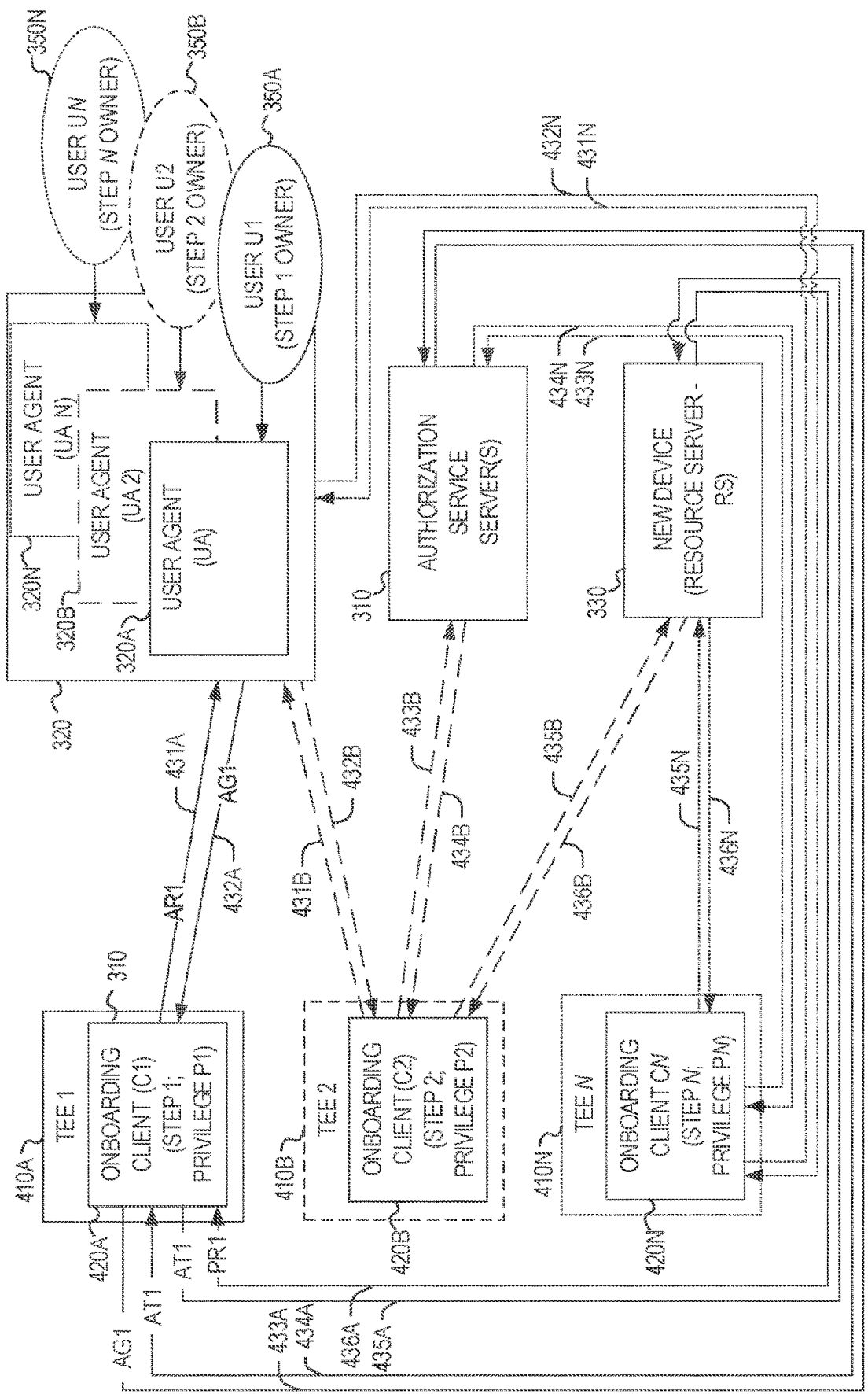
FIG. 5 illustrates a diagram of a system use case flow in the context of a 3-way authorization protocol for an onboarding process, according to an example.

FIG. 5 illustrates a diagram of an example system use case flow in the context of a 3-way authorization protocol for an onboarding process. In connection with client applications (such as the OBT), this protocol may be employed to obtain approval and perform one or more of the onboarding steps. To achieve the goals of least-privilege, the client application (OBT) may be divided into separate applications or execution environments (such as processes, hypervisor guests, Trusted Execution Environments, and the like) with a privilege that entitles the client application to perform the set of duties prescribed under the process step. Each Fog user 350 (U1-Un) may further be authorized or engaged to approve performance of a specific onboarding step by a specific onboarding client, as each step of the process is performed.

In an example, the operations performed to obtain authorization for a respective onboarding step in the context of a 3-way authorization protocol may include the following:

Step 1: The client C1 420A (e.g., operating on a first TEE 410A) requests authorization to perform a first onboarding step by supplying a first authorization request (AR1 message 431A) to a User Agent (UA) 320A. The Client C1 420A may use an application key or certificate to sign or otherwise protect the AR1 message 431A. The UA 320A may verify the request AR1 message 431A by verifying the C1 certificate/key. The UA 320A may notify a human user U1 350A, such as to inform the human user that a first onboarding step is being requested. The human user may be informed using privilege P1, the privilege being used to perform the onboarding step as well as to inform and approve an identity of the client C1 420A that is performing the step.

Step 2: The UA 320A replies with an Authorization Grant (AG1 message 432A) where the UA key may be used to sign or otherwise protect the AG1 message 432A. The UA 320A may withhold use of its private/secret key on condition of the User U1 350A responding in the affirmative. The Client C1 420A verifies the response AG1 message 432A by checking the UA signature and by observing an additional user supplied context accompanying AG1 432A.

Step 3: Client C1 420A identifies a resource server RS (new device 330) to which it wants to apply the onboarding function (e.g., in response to an onboard request), signs (RS, AG1) the message, and sends the signed AG1 message 433A to an Authorization Server AS 310 where the AG1 message 433A is verified. In various examples, the AS 310 may perform this verification for a particular resource (device) or for a group of devices. The AS 310 verifies all applied signatures and verifies that C1 420A is authorized to perform a first onboarding step. This may include verifying P1 is a privilege possessed by C1 420A. The AS 310 then signs the AG1 message 432; in an example, the AS may remove the C1 and UA signatures to create a new Access Token AT1 message 434A that is delivered to the client C1.

Step 4: Client C1 420A verifies the AT1 message 434A and proceeds to make a resource request of a RS/new device 330, to commence the onboarding operation.

Step 5: The client C1 420A generates a request to perform a first step of onboarding to the new device and includes the token AT1 in message 435A. C1 signs the request including AT1, and sends the signed AT1 message 435A to the new device 330. The new device 330 verifies the message came from C1 420A and that AT1 was signed by AS 310 (and thus was authorized by the authorization service). The new device 330 may be expected to have been pre-provisioned with the AS public key or its trust anchor a priori. The new device 330 concludes that C1 420A is authorized to perform an onboarding step by virtue of AT1 having been signed by AS 310. The new device 330 may also consider whether AG1 exists and is signed by a user agent known to the RS. For example, a vendor of the RS device may embed a PIN or supply chain tracking value that a UA uses to acknowledge grant of authority to perform a first onboarding step.

Step 6: The RS of the new device 330 allows a first onboarding step to be applied by C1 420A and then replies with message 436A acknowledging completion of a first onboarding step. The RS may supply a protected resource PR1 by signing the message 436A with a signing key of the RS. A simple acknowledgement that a first onboarding step was applied (or alternatively failed to apply) may be indicated in the contents of the PR1 message 436A. Further, the RS may parse the token AT1 to obtain additional guidance regarding onboarding steps. For example, the token may include values from the UA 320A such as a PIN, or another value used by the RS to establish that a correct UA was involved in granting of authorization to C1 420A to perform a first onboarding step. Likewise, a token may contain values originated by an AS 310 that are again interpreted by a RS. For example, if a backup or replacement AS 310 to be used, a first AS 310 may include a value identifying a second AS (not shown) that may be used as a backup or replacement AS.

In a further example, the RS of the new device 330 may also use the token given in Step-5 (e.g., from message AT1 435A) to authorize setup and configuration provided by another party. For example, a separate Credential Management Service (CMS) and/or a local Access Management Service (AMS) and/or an Image Update Service (IUS) and/or a Cloud Collaboration Service (CCS) or the like may be employed to configure the RS with the settings, setup, registration and configuration necessary for participation in the activities the respective services are designed to enable.

A second onboarding step, as provided by Client C2 420A (e.g., operating in a second TEE 410B), may be performed according to a similar pattern of that performed by C1 for the first onboarding step (e.g., with the operation of steps 1-6 with messages 431B, 432B, 433B, 434B, 435B, 436B). It may be appropriate for a second user agent 320B and a second user 350B to authorize the application and performance of the second onboarding step. In this way, onboarding for the device may be achieved only when a consensus of multiple stakeholders (multiple devices) is reached. Thus, separation of duties may extend to include multiple users in addition to multiple client applications. Subsequently, a third, fourth, or more onboarding steps may be performed following a similar pattern as the first (and second) (e.g., with onboarding client CN 420N, operating in another TEE 410N, using messages 431N, 432N, 433N, 434N, 435N, 436N). The onboarding steps may include steps specific to any or all of the above described onboarding methods or others not described herein.

In a further example, a generalized client may be used in the IoT network to manage a user authentication experience in connection with the present techniques. User accounts may be maintained on a separate "service" such as a DOTS, whereas user authorizations may be maintained on a separate "service" as well such as a DOTS or OAuth2 service. The generalized client may also host all the services locally on the same device (e.g., OCF device) instance. In such a scenario, the user logs into the "network" through the generalized client application and the generalized client enforces user privileges to perform "network" operations including onboarding. The DOTS may or may not enforce user privileges, depending on the sophistication or capabilities of the DOTS (for example, if an authorization token is not handled by the DOTS). However, in this scenario the generalized client relies on DOTS to implement the various trusted steps to onboarding, such as with use of the presently disclosed techniques.

Figure 6:
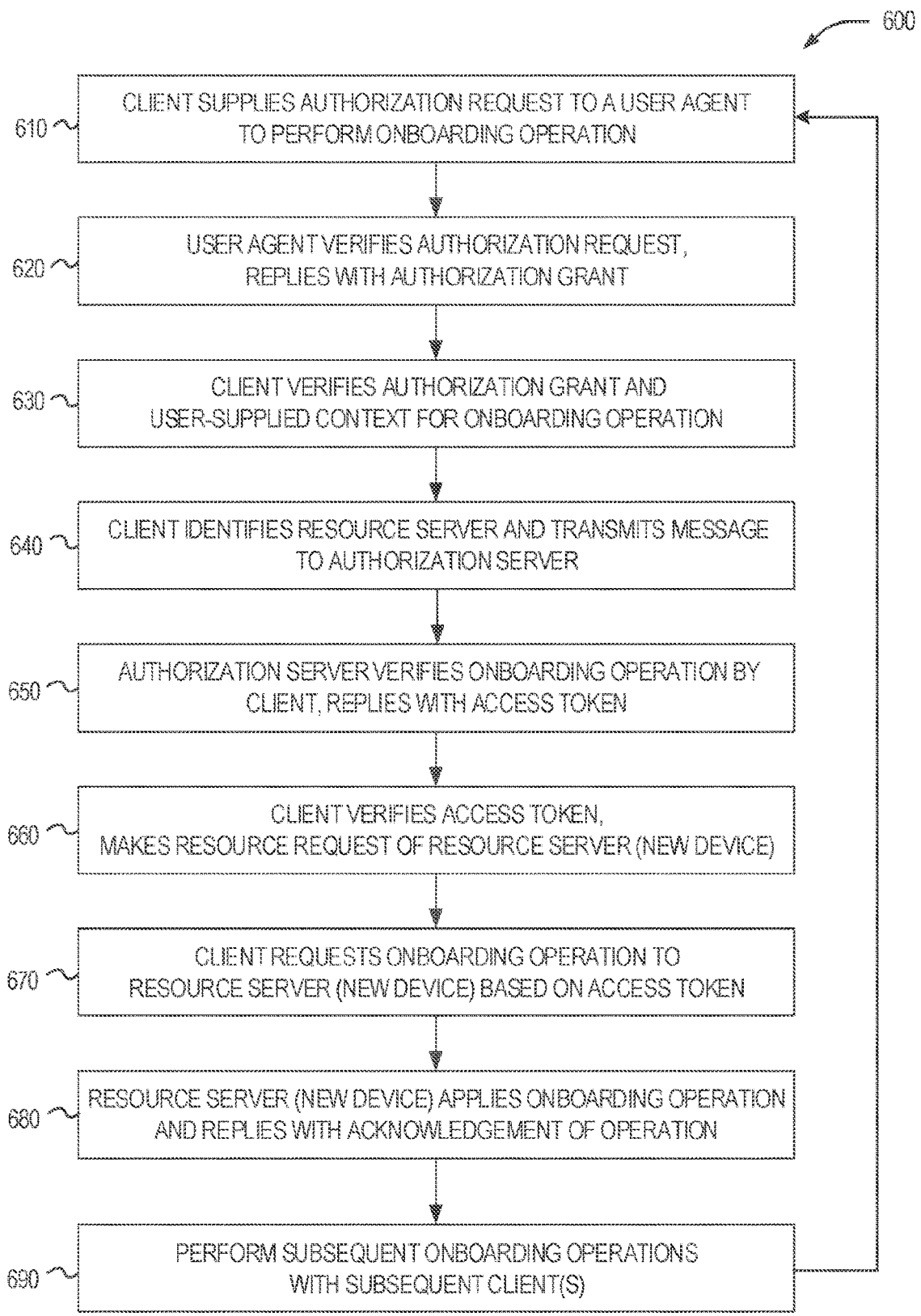
FIG. 6 illustrates a flowchart of an example technique performed among network entities for user-authorized onboarding operations, according to an example.

FIG. 6 illustrates a flowchart 600 of an example technique performed among network entities for user-authorized onboarding operations. As shown, the operations of the flowchart 600 are depicted as sequential; in other examples, the operations of the flowchart 600 may be performed in another order or with additional (or fewer) operations. It will be understood that the flowchart 600 provides a simplified overview of the operations discussed above with reference to FIGS. 4 and 5, and so additional implementation details discussed above will also be applicable to the following operations.

As shown, the operations of the flowchart 600, for a respective onboarding step, include a particular client (e.g., a first onboarding client) supplying and communicating an authorization request to a user agent to perform the respective onboarding step (operation 610). The user agent verifies this authorization request for the onboarding step, and replies with an authorization grant (operation 620), which establishes or defines privileges to perform the particular onboarding operation. In response to this authorization grant, the client verifies the authorization grant and any user-supplied context for the onboarding operation (operation 630).

The operations of the flowchart 600 continue with the identification of the resource server (the device to be onboarded), and the transmission of a message to an authorization server (operation 640) regarding the onboarding step. The authorization server verifies the particular onboarding step to be taken by the client, and replies with an access token (operation 650). The client further operates to verify this access token (operation 660).

With verified authorization, and an access token, the client proceeds to make a resource request from the resource server (the device to be onboarded) (operation 660). The client further requests the particular onboarding step be performed, based on the access token that is valid to perform the onboarding step (operation 670). The resource server then attempts to perform the onboarding step, and responds with an acknowledgment or status of the onboarding step (operation 680). Finally, additional onboarding steps as part of the overall onboarding process are performed by subsequent clients (operation 690), repeating operations 610-680 on behalf of other onboarding clients.

In a further example, a blockchain may be used in each step of the onboarding process to record the actions applied by the respective step. For example, a trusted execution environment (e.g., "TEE1") performing Step 1 of the onboarding process may use a TEE1 signing key to sign the OAuth2 information used to obtain authorization from User1 and may include a description of the Step 1 operations performed. This also may include structures describing additional onboarding steps that are to be applied by the RS (the new device to be onboarded) and likewise additional steps that the authorization token authorizes according to the contents of the token. Also for example, the token may contain a signed authorization statement (e.g., using JOSE or COSE syntax) where the signer is the client onboarding tool having authorization to perform a step-x of the onboarding sequence. Thus, the new device named in the token may use a credential authorized by a credential management service (CMS) to provision to both the new device and the next onboarding service provider, such that the next onboarding service provider may also verify the token.

The techniques discussed herein accordingly enable flexibility in formation of a Fog network among multiple users that may have multiple/different web identities and where they are not required to have a priori adherence to a common identity provider in order to officiate in the formation of a common Fog network. Each participant may employ an onboarding step using a client application that implements that step and where the client is protected by a TEE. The user may introduce a preferred AS to the TEE for establishment of a trusted credential, trust anchor, or other cryptographic key that may be used to authenticate the AS selected by the User. Accordingly, variations or additional security mechanisms may also be appropriately added to the onboarding process.

In a further example, the techniques discussed herein may be distributed across multiple devices and locations, but yet functioning in a manner as if centralized. Logging of each step with a blockchain ensures any of the participants or a third party may verify the onboarding steps were followed by another party according to expectation.

Figure 7:
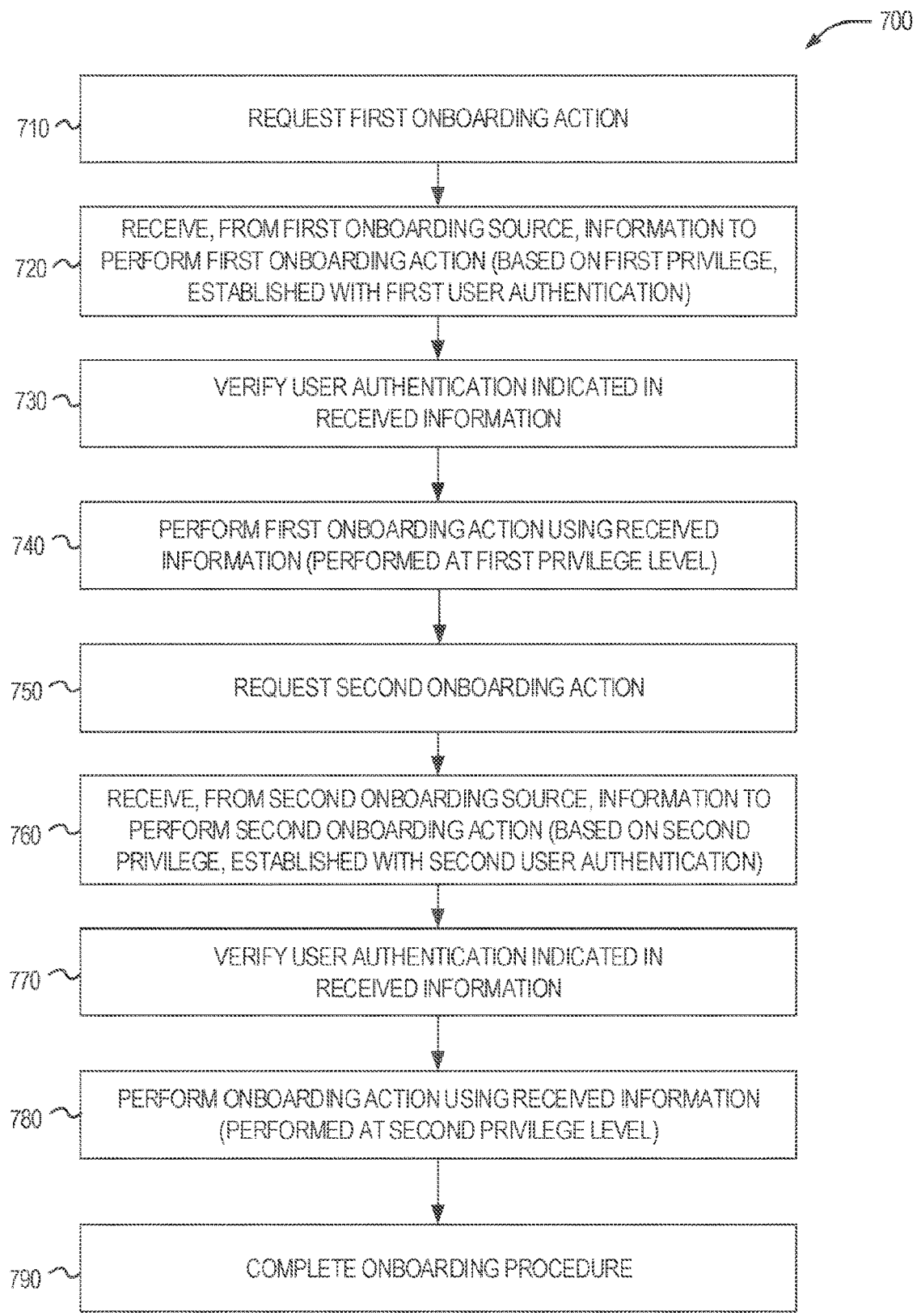
FIG. 7 illustrates a flowchart of an example technique performed by a server device for user-authorized onboarding operations on the device in an IoT network, according to an example.

FIG. 7 illustrates a flowchart 700 of an example technique performed by a server device for user-authorized onboarding operations on the device in an IoT network. The following operations are depicted from the perspective of an IoT device or system to be onboarded into an IoT network topology (with this device referred to as a "new device" or a "resource server"). However, it will be understood that the techniques and operations of flowchart 700 may be further adapted from either client or server side perspectives, or systems involving both client, server, and intermediate entities.

The flowchart 700 begins with a request, provided from the device to a first onboarding client, to request a first onboarding action (operation 710). This first onboarding action may occur as part of a sequence of multiple onboarding actions (including in connection with a second onboarding action discussed with operations 750-780 below). In an example, the first and second onboarding actions are performed as part of a plurality of onboarding actions in a particular onboarding procedure, including separate actions for: connectivity, discovery, trust establishment, service provisioning, and device configuration. Also in an example, the respective onboarding actions are performed in response to (and subsequent to) approvals provided by a plurality of respective user agents. For instance, the respective user agents may initiate various user interactions to obtain the approvals for the onboarding actions from respective human users, and store this information for use in the following onboarding activities.

The flowchart 700 continues as the device obtains, from the first onboarding client, first information to perform the first onboarding action (operation 720). In an example, the first onboarding action is based on a first privilege level established from a first user authentication (e.g., a first user authentication previously established with a user agent). This received information may be verified by the device (operation 730), including the verification of any credentials or signatures that indicate approval by a valid user agent or authorization service server. For instance, this may include validation of information provided in the three-way authorization protocol described above, or validation of information logged in a blockchain ledger. Upon successful verification, the device performs the first onboarding action, using the received information from the onboarding client (operation 740). This onboarding action is performed at the first privilege level, approved by the user agent.

The flowchart 700 continues with another request, provided from the device to a second onboarding client, to request the second onboarding action (operation 750). As discussed above, this second onboarding action may occur as part of a plurality of onboarding actions in a particular onboarding procedure.

The flowchart 700 continues as the device obtains, from the second onboarding client, second information to perform the second onboarding action (operation 760). In an example, the second onboarding action is based on a second privilege level established from a second user authentication (e.g., a second user authentication previously established with the same or a different user agent), with the second privilege level different from the first privilege level. This received information may be verified by the device (operation 770), including the verification techniques discussed above (for operation 730). Upon successful verification, the device performs the second onboarding action (operation 780), using the received information from the second onboarding client. This second onboarding action is performed at the second privilege level, approved by the user agent.

The flowchart 700 concludes with the completion of the onboarding procedure (operation 790), which may include the performance of additional onboarding actions, additional transactions and verifications, and repeating actions with the same or different onboarding devices. Based on the completion of the onboarding procedure, the device may move to an operational (onboarded state) in the IoT network. However, additional operations to repeat or re-perform the onboarding procedure may be conducted in other scenarios. Further, although the techniques discussed above have focused on onboarding, other variations relevant to provisioning, credentialing, and other operations may be performed with variations to these techniques.

As discussed above, the various onboarding actions (such as the first onboarding action and the second onboarding action) may be conducted in response to respective user authentications obtained with a three-way authorization protocol, such as where the three-way authorization protocol includes obtaining approval from at least one user agent and obtaining approval from an authorization service on behalf of the respective onboarding client. In an example, the approval from the authorization service is received in an OAuth2, OpenID-Connect, or Kerberos interaction obtained on behalf of the at least one user agent. Also in this example, logging information for the approval from the at least one user agent and logging information for the approval from the authorization service may be written to a blockchain ledger. In a further example, the three-way authorization protocol includes: a request from the respective onboarding device to the user agent to obtain the approval, a response from the user agent to indicate the approval, a request from the respective onboarding device to the authorization service to obtain an authorization service token, and a response from the authorization service to indicate the authorization service token. In this example, information to perform the respective onboarding action may include information based on the authorization service token and the response from the user agent.

As discussed above, the preceding techniques may involve the use of OCF specification-based operations. For instance, communications in the IoT network to perform the onboarding operations may be conducted according to one or more OCF) specifications, such that one or more of the communications comprise Representational State Transfer (RESTful) interactions among one or more IoT network topologies. In an OCF model, the notion of the client and server is realized through roles, where any Device may act as a Client and initiate a RESTful operation on any Device acting as a Server. Likewise, any Device that exposes Entities as Resources may act as a Server. Each RESTful operation contains all the information necessary to understand the context of the interaction and may be deployed using a small set of generic operations (e.g., CREATE, RETRIEVE, UPDATE, DELETE and NOTIFY (CRUDN)). Thus, the techniques and scenarios discussed above for onboarding may be operated with use of this Device-Server RESTful interaction model.

In additional examples, the operations and functionality described above with reference to FIGS. 3 to 7 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
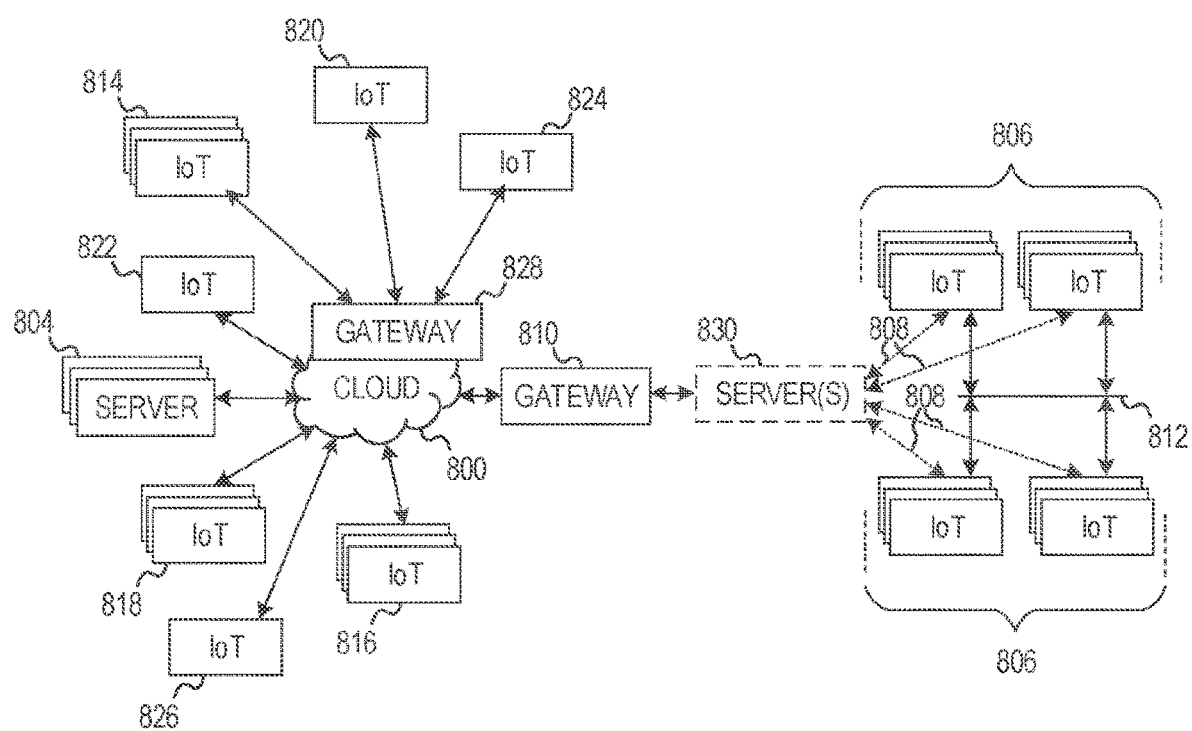
FIG. 8 illustrates a block diagram of a network illustrating communications among a number of IoT devices, according to an example.

FIG. 8 illustrates a drawing of a cloud computing network, or cloud 800, in communication with a number of Internet of Things (IoT) devices. The cloud 800 may represent the Internet, or may be a local area network (LAN), or a wide area network (WAN), such as a proprietary network for a company. The IoT devices may include any number of different types of devices, grouped in various combinations. For example, a traffic control group 806 may include IoT devices along streets in a city. These IoT devices may include stoplights, traffic flow monitors, cameras, weather sensors, and the like. The traffic control group 806, or other subgroups, may be in communication with the cloud 800 through wired or wireless links 808, such as LPWA links, optical links, and the like. Further, a wired or wireless sub-network 812 may allow the IoT devices to communicate with each other, such as through a local area network, a wireless local area network, and the like. The IoT devices may use another device, such as a gateway 810 or 828 to communicate with remote locations such as the cloud 800; the IoT devices may also use one or more servers 830 to facilitate communication with the cloud 800 or with the gateway 810. For example, the one or more servers 830 may operate as an intermediate network node to support a local edge cloud or fog implementation among a local area network. Further, the gateway 828 that is depicted may operate in a cloud-to-gateway-to-many edge devices configuration, such as with the various IoT devices 814, 820, 824 being constrained or dynamic to an assignment and use of resources in the cloud 800.

Other example groups of IoT devices may include remote weather stations 814, local information terminals 816, alarm systems 818, automated teller machines 820, alarm panels 822, or moving vehicles, such as emergency vehicles 824 or other vehicles 826, among many others. Each of these IoT devices may be in communication with other IoT devices, with servers 804, with another IoT Fog device or system (not shown, but depicted in FIG. 2), or a combination therein. The groups of IoT devices may be deployed in various residential, commercial, and industrial settings (including in both private or public environments).

As may be seen from FIG. 8, a large number of IoT devices may be communicating through the cloud 800. This may allow different IoT devices to request or provide information to other devices autonomously. For example, a group of IoT devices (e.g., the traffic control group 806) may request a current weather forecast from a group of remote weather stations 814, which may provide the forecast without human intervention. Further, an emergency vehicle 824 may be alerted by an automated teller machine 820 that a burglary is in progress. As the emergency vehicle 824 proceeds towards the automated teller machine 820, it may access the traffic control group 806 to request clearance to the location, for example, by lights turning red to block cross traffic at an intersection in sufficient time for the emergency vehicle 824 to have unimpeded access to the intersection.

Clusters of IoT devices, such as the remote weather stations 814 or the traffic control group 806, may be equipped to communicate with other IoT devices as well as with the cloud 800. This may allow the IoT devices to form an ad-hoc network between the devices, allowing them to function as a single device, which may be termed a Fog device or system (e.g., as described above with reference to FIG. 2).

Figure 9:
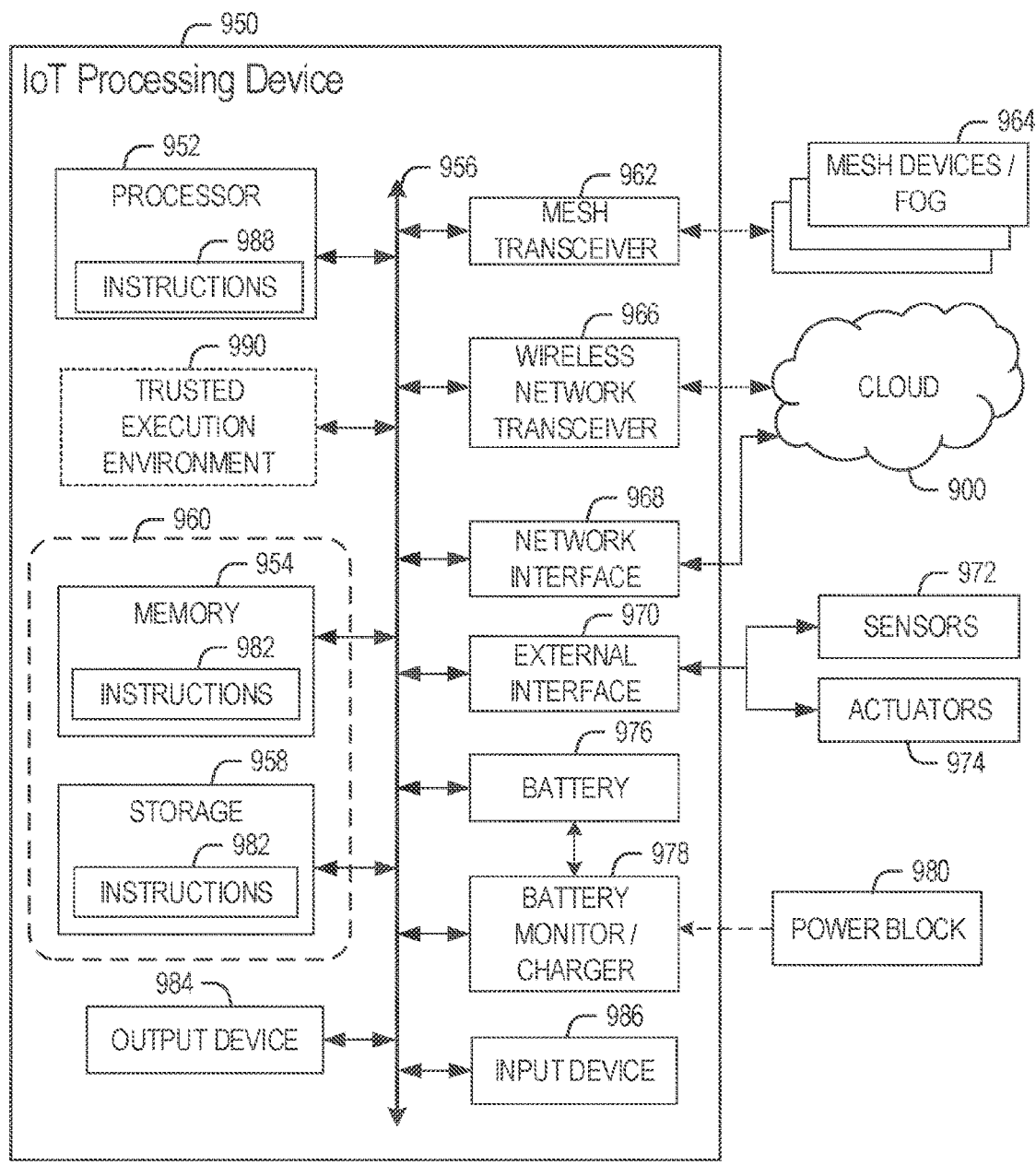
FIG. 9 illustrates a block diagram for an example IoT processing system architecture upon which any one or more of the techniques (e.g., operations, processes, methods, and methodologies) discussed herein may be performed, according to an example.

FIG. 9 is a block diagram of an example of components that may be present in an IoT device 950 for implementing the techniques described herein. The IoT device 950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 950, or as components otherwise incorporated within a chassis of a larger system. Additionally, the block diagram of FIG. 9 is intended to depict a high-level view of components of the IoT device 950. However, some of the components shown may be omitted, additional components may be present, and different arrangement of the components shown may occur in other implementations.

The IoT device 950 may include a processor 952, which may be a microprocessor, a multi-core processor, a multithreaded processor, an ultra-low voltage processor, an embedded processor, or other known processing element. The processor 952 may be a part of a system on a chip (SoC) in which the processor 952 and other components are formed into a single integrated circuit, or a single package, such as the Edison™ or Galileo™ SoC boards from Intel. As an example, the processor 952 may include an Intel® Architecture Core™ based processor, such as a Quark™, an Atom™, an i3, an i5, an i8, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A8 processor from Apple® Inc., a Snapdragon™ processor from Qualcomm® Technologies, Inc., or an OMAP™ processor from Texas Instruments, Inc.

The processor 952 may communicate with a system memory 954 over an interconnect 956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q18P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 958 may also couple to the processor 952 via the interconnect 956. In an example the storage 958 may be implemented via a solid state disk drive (SSDD). Other devices that may be used for the storage 958 include flash memory cards, such as SD cards, microSD cards, xD picture cards, and the like, and USB flash drives. In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in a SoC based system. Other bus systems may be included, such as an I2C interface, an SPI interface, point to point interfaces, and a power bus, among others.

The interconnect 956 may couple the processor 952 to a mesh transceiver 962, for communications with other mesh devices 964. The mesh transceiver 962 may use any number of frequencies and protocols, such as 2.4 Gigahertz (GHz) transmissions under the IEEE 902.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 964. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 962 may communicate using multiple standards or radios for communications at different range. For example, the IoT device 950 may communicate with close devices, e.g., within about 10 meters, using a local transceiver based on BLE, or another low power radio, to save power. More distant mesh devices 964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 966 may be included to communicate with devices or services in the cloud 900 via local or wide area network protocols. The wireless network transceiver 966 may be a LPWA transceiver that follows the IEEE 802.15.4, or IEEE 802.15.4g standards, among others. The IoT device 950 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the mesh transceiver 962 and wireless network transceiver 966, as described herein. For example, the radio transceivers 962 and 966 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 962 and 966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 968 may be included to provide a wired communication to the cloud 900 or to other devices, such as the mesh devices 964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to allow connect to a second network, for example, a NIC 968 providing communications to the cloud over Ethernet, and a second NIC 968 providing communications to other devices over another type of network.

The interconnect 956 may couple the processor 952 to an external interface 970 that is used to connect external devices or subsystems. The external devices may include sensors 972, such as accelerometers, level sensors, flow sensors, optical light sensors, camera sensors, temperature sensors, a global positioning system (GPS) sensors, pressure sensors, barometric pressure sensors, and the like. The external interface 970 further may be used to connect the IoT device 950 to actuators 974, such as power switches, valve actuators, an audible sound generator, a visual warning device, and the like.

In some optional examples, various input/output (I/O) devices may be present within, or connected to, the IoT device 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 950.

A battery 976 may power the IoT device 950, although in examples in which the IoT device 950 is mounted in a fixed location, it may have a power supply coupled to an electrical grid. The battery 976 may be a lithium ion battery, or a metal-air battery, such as a zinc-air battery, an aluminum-air battery, a lithium-air battery, and the like.

A battery monitor/charger 978 may be included in the IoT device 950 to track the state of charge (SoCh) of the battery 976. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 978 may communicate the information on the battery 976 to the processor 952 over the interconnect 956. The battery monitor/charger 978 may also include an analog-to-digital (ADC) convertor that allows the processor 952 to directly monitor the voltage of the battery 976 or the current flow from the battery 976. The battery parameters may be used to determine actions that the IoT device 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the IoT device 950. A wireless battery charging circuit, such as an LTC4020 chip from Linear Technologies of Milpitas, Calif., among others, may be included in the battery monitor/charger 978. The specific charging circuits chosen depend on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine readable medium 960 including code to direct the processor 952 to perform electronic operations in the IoT device 950. The processor 952 may access the non-transitory, machine readable medium 960 over the interconnect 956. For instance, the non-transitory, machine readable medium 960 may be embodied by devices described for the storage 958 of FIG. 9 or may include specific storage units such as optical disks, flash drives, or any number of other hardware devices. The non-transitory, machine readable medium 960 may further include, provide, or invoke instructions 988 to direct the processor 952 to perform a specific sequence or flow of actions, for example, as described with respect to the flowchart(s) and block diagram(s) of operations and functionality depicted above.

In an example, the instructions 988 on the processor 952 (separately, or in combination with the instructions 988 of the machine readable medium 960) may configure execution or operation of a trusted execution environment (TEE) 990. In an example, the TEE 990 operates as a protected area accessible to the processor 952 to enable secure access to data and secure execution of instructions. Various implementations of the TEE 990, and an accompanying secure area in the processor 952 or the memory 954 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 950 through the TEE 990 and the processor 952.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments are suggested according to the structures and techniques described above, and specified in the following examples and claims.

Example 1 is a device operable in an Internet of Things (IoT) network, comprising: communications circuitry; processing circuitry; and at least one storage device including instructions embodied thereon, wherein the instructions, which when executed by the processing circuitry, configure the processing circuitry to perform operations for user-authorized onboarding in the IoT network, the operations to: obtain, from a first onboarding device via the communications circuitry, first information to perform a first onboarding action, wherein the first onboarding action is based on a first privilege level established from a first user authentication; perform the first onboarding action on the device using the first information; obtain, from a second onboarding device via the communications circuitry, second information to perform a second onboarding action, wherein the second onboarding action is based on a second privilege level established from a second user authentication, and wherein the second onboarding device is distinct from the first onboarding device; and perform the second onboarding action on the device using the second information.

In Example 2, the subject matter of Example 1 includes, wherein the first and second onboarding actions are performed as part of a plurality of onboarding actions, the plurality of onboarding actions including: connectivity, discovery, trust establishment, service provisioning, and device configuration actions.

In Example 3, the subject matter of Example 2 includes, wherein respective onboarding actions of the plurality of onboarding actions are performed in response to approvals provided by a plurality of respective user agents.

In Example 4, the subject matter of Example 3 includes, wherein the respective user agents prompt user interaction to obtain the approvals for the plurality of onboarding actions from respective human users.

In Example 5, the subject matter of Examples 1-4 includes, the operations further to: initiate a first request of the first onboarding action to the first onboarding device, wherein the first information to perform the first onboarding action is provided in response to the first request; and initiate a second request of the second onboarding action to the second onboarding device, wherein the second information to perform the second onboarding action is provided in response to the second request.

In Example 6, the subject matter of Examples 1-5 includes, the operations further to: verify the first user authentication, based on the first information to perform the first onboarding action; and verify the second user authentication, based on the second information to perform the second onboarding action.

In Example 7, the subject matter of Examples 1-6 includes, wherein the first onboarding action and the second onboarding action are conducted in response to respective user authentications obtained with a three-way authorization protocol, wherein the three-way authorization protocol includes obtainment of approval from at least one user agent and obtainment of approval from an authorization service on behalf of the respective onboarding device.

In Example 8, the subject matter of Example 7 includes, OpenID-Connect, or Kerberos interaction obtained on behalf of the at least one user agent.

In Example 9, the subject matter of Examples 7-8 includes, the operations further to log information for the approval from the at least one user agent and log information for the approval from the authorization service to a blockchain ledger.

In Example 10, the subject matter of Examples 7-9 includes, wherein the three-way authorization protocol includes: a request from the respective onboarding device to the user agent to obtain the approval, a response from the user agent to indicate the approval, a request from the respective onboarding device to the authorization service to obtain an authorization service token, and a response from the authorization service to indicate the authorization service token; and wherein information to perform the respective onboarding action includes information based on the authorization service token and the response from the user agent.

In Example 11, the subject matter of Examples 1-10 includes, wherein communications in the IoT network to perform the operations are conducted according to one or more Open Connectivity Foundation (OCF) specifications, and wherein one or more of the communications comprise Representational State Transfer (RESTful) interactions among one or more IoT network topologies.

Example 12 is an Internet of Things (IoT) network, comprising: a first onboarding client, the first onboarding client configured to perform a first onboarding action in the IoT network based on a first privilege level, wherein the first privilege level is established from a first user authentication with a first user agent, and wherein the first user authentication is indicated with a first authorization token from an authorization service server; a second onboarding client, the second onboarding client configured to perform a second onboarding action in the IoT network based on a second privilege level, wherein the second privilege level is established from a second user authentication with a second user agent, and wherein the second user authentication is indicated with a second authorization token from the authorization service server; and a server to be onboarded, the server configured to: receive, from the first onboarding client via the IoT network, first information to perform the first onboarding action, wherein the first onboarding action is based on the first privilege level; perform the first onboarding action on the server using the first information; receive, from the second onboarding client via the IoT network, second information to perform the second onboarding action, wherein the second onboarding action is based on the second privilege level; and perform the second onboarding action on the server using the second information.

In Example 13, the subject matter of Example 12 includes, wherein the first onboarding client and the second onboarding client are operated from respective trusted executed environments provided by one or more devices.

In Example 14, the subject matter of Examples 12-13 includes, an OpenID-Connect, or a Kerberos token.

In Example 15, the subject matter of Examples 12-14 includes, a plurality of user agents, including the first user agent and the second user agent to obtain the respective user authentications.

In Example 16, the subject matter of Example 15 includes, a blockchain ledger interface, the blockchain ledger interface adapted to write logging information for approval from the plurality of user agents and logging information for approval from the authorization service server to a blockchain ledger.

Example 17 is a method for user-authorized onboarding in an IoT network, comprising a plurality of operations executed with a processor and memory of a device, the operations comprising: obtaining, from a first onboarding device, first information to perform a first onboarding action, wherein the first onboarding action is based on a first privilege level established from a first user authentication;

performing the first onboarding action on the device using the first information; obtaining, from a second onboarding device, second information to perform a second onboarding action, wherein the second onboarding action is based on a second privilege level established from a second user authentication, and wherein the second onboarding device is distinct from the first onboarding device; and performing the second onboarding action on the device using the second information.

In Example 18, the subject matter of Example 17 includes, performing the first and second onboarding actions as part of a plurality of onboarding actions, the plurality of onboarding actions including: connectivity, discovery, trust establishment, service provisioning, and device configuration actions.

In Example 19, the subject matter of Example 18 includes, wherein respective onboarding actions of the plurality of onboarding actions are performed in response to approvals provided by a plurality of respective user agents.

In Example 20, the subject matter of Example 19 includes, wherein the respective user agents prompt user interaction to obtain the approvals for the plurality of onboarding actions from respective human users.

In Example 21, the subject matter of Examples 17-20 includes, initiating a first request of the first onboarding action to the first onboarding device, wherein the first information to perform the first onboarding action is provided in response to the first request; and initiating a second request of the second onboarding action to the second onboarding device, wherein the second information to perform the second onboarding action is provided in response to the second request.

In Example 22, the subject matter of Examples 17-21 includes, verifying the first user authentication, based on the first information to perform the first onboarding action; and verifying the second user authentication, based on the second information to perform the second onboarding action.

In Example 23, the subject matter of Examples 17-22 includes, wherein the first onboarding action and the second onboarding action are conducted in response to respective user authentications obtained with a three-way authorization protocol, wherein the three-way authorization protocol includes obtainment of approval from at least one user agent and obtainment of approval from an authorization service on behalf of the respective onboarding device.

In Example 24, the subject matter of Example 23 includes, OpenID-Connect, or Kerberos interaction obtained on behalf of the at least one user agent.

In Example 25, the subject matter of Examples 23-24 includes, logging information for the approval from the at least one user agent and log information for the approval from the authorization service to a blockchain ledger.

In Example 26, the subject matter of Examples 23-25 includes, wherein the three-way authorization protocol includes: a request from the respective onboarding device to the user agent to obtain the approval, a response from the user agent to indicate the approval, a request from the respective onboarding device to the authorization service to obtain an authorization service token, and a response from the authorization service to indicate the authorization service token; and wherein information to perform the respective onboarding action includes information based on the authorization service token and the response from the user agent.

In Example 27, the subject matter of Examples 17-26 includes, wherein communications in the IoT network to perform the operations are conducted according to one or more Open Connectivity Foundation (OCF) specifications, and wherein one or more of the communications comprise Representational State Transfer (RESTful) interactions among one or more IoT network topologies.

Example 28 is a device-readable storage medium including instructions, wherein the instructions, when executed by a processing circuitry of a device, cause the processing circuitry to perform operations of any of Examples 17 to 27.

Example 29 is an apparatus, comprising: means for obtaining, from a first onboarding device, first information to perform a first onboarding action, wherein the first onboarding action is based on a first privilege level established from a first user authentication; means for performing the first onboarding action on the apparatus using the first information; means for obtaining, from a second onboarding device, second information to perform a second onboarding action, wherein the second onboarding action is based on a second privilege level established from a second user authentication, and wherein the second onboarding device is distinct from the first onboarding device; and means for performing the second onboarding action on the apparatus using the second information.

In Example 30, the subject matter of Example 29 includes, means for performing the first and second onboarding actions as part of a plurality of onboarding actions, the plurality of onboarding actions including: connectivity, discovery, trust establishment, service provisioning, and device configuration actions.

In Example 31, the subject matter of Example 30 includes, means for coordinating respective onboarding actions of the plurality of onboarding actions, the respective onboarding actions of the plurality of onboarding actions being performed in response to approvals provided by a plurality of respective user agents.

In Example 32, the subject matter of Example 31 includes, means for communicating with the respective user agents, wherein the respective user agents prompt user interaction to obtain the approvals for the plurality of onboarding actions from respective human users.

In Example 33, the subject matter of Examples 29-32 includes, means for initiating a first request of the first onboarding action to the first onboarding device, wherein the first information to perform the first onboarding action is provided in response to the first request; and means for initiating a second request of the second onboarding action to the second onboarding device, wherein the second information to perform the second onboarding action is provided in response to the second request.

In Example 34, the subject matter of Examples 29-33 includes, means for verifying the first user authentication, based on the first information to perform the first onboarding action; and means for verifying the second user authentication, based on the second information to perform the second onboarding action.

In Example 35, the subject matter of Examples 29-34 includes, means for conducting the first onboarding action and the second onboarding action in response to respective user authentications obtained with a three-way authorization protocol, wherein the three-way authorization protocol includes obtainment of approval from at least one user agent and obtainment of approval from an authorization service on behalf of the respective onboarding device.

In Example 36, the subject matter of Example 35 includes, means for receiving the approval from the authorization service in an OAuth2, OpenID-Connect, or Kerberos interaction obtained on behalf of the at least one user agent.

In Example 37, the subject matter of Examples 35-36 includes, means for logging information for the approval from the at least one user agent and log information for the approval from the authorization service to a blockchain ledger.

In Example 38, the subject matter of Examples 35-37 includes, means for coordinating the three-way authorization protocol, the three-way authorization protocol including: a request from the respective onboarding device to the user agent to obtain the approval, a response from the user agent to indicate the approval, a request from the respective onboarding device to the authorization service to obtain an authorization service token, and a response from the authorization service to indicate the authorization service token; and means for obtaining information to perform the respective onboarding action, wherein the information to perform the respective onboarding action includes information based on the authorization service token and the response from the user agent.

In Example 39, the subject matter of Examples 29-38 includes, means for conducting communications according to one or more Open Connectivity Foundation (OCF) specifications, wherein one or more of the communications comprise Representational State Transfer (RESTful) interactions among one or more IoT network topologies.

Example 40 is a device Fog adapted to perform the operations of any of Examples 1 to 39.

Example 41 is a cloud service server adapted to perform the operations of a cloud service invoked by any of Examples 1 to 39.

Example 42 is an edge computing device adapted to perform the operations of a client device invoked by any of Examples 1 to 39.

Example 43 is a device onboarding service server adapted to perform the operations of onboarding invoked by any of Examples 1 to 39.

Example 44 is an Open Connectivity Foundation (OCF) device, configured as a server, client, or intermediary according to an OCF specification, comprising means to implement the operations of any of Examples 1 to 39.

Example 45 is an Internet of Things (IoT) network topology, the IoT network topology comprising respective communication links adapted to perform communications for the operations of any of Examples 1 to 39.

Example 46 is a network comprising respective devices and device communication mediums for performing any of the operations of Examples 1 to 39.

Example 47 is an apparatus comprising means for performing any of the operations of Examples 1 to 39.

Example 48 is a system to perform the operations of any of Examples 1 to 47.

Example 49 is a method to perform the operations of any of Examples 1 to 47.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device operable in an Internet of Things (IoT) network, the device comprising:
    a processor; and
    memory, including instructions stored thereon, which when executed by the processor, cause the processor to execute operations, the operations comprising:
    obtaining a command from a first onboarding entity, the command to perform a first onboarding action on the device, wherein the first onboarding action is based on a first privilege level established from a first user authorization;
    performing the first onboarding action on the device using the command;
    obtaining an additional command from a second onboarding entity to perform a second onboarding action on the device, wherein the second onboarding action is based on a second privilege level established from a second user authorization, and wherein the second onboarding entity is distinct from the first onboarding entity; and
    performing the second onboarding action on the device using the additional command;
    wherein the first onboarding entity uses a first communication protocol, the second onboarding entity uses a second communication protocol, and the device uses a third communication protocol, and wherein the processor causes data in the first communication protocol, data in the second communication protocol, and data in the third communication protocol to be converted into a standard communication protocol to provide multi-standard connectivity enabling the device, the first onboarding entity, and the second onboarding entity to communicate with each other.

2. The device of claim 1, wherein the first onboarding entity operates on a first onboarding device and the second onboarding entity operates on a second onboarding device.

3. The device of claim 2, wherein the first onboarding device operates with a first Trusted Execution Environment (TEE) and the second onboarding device operates with a second TEE distinct from the first TEE.

4. The device of claim 3, wherein at least one of the first TEE or the second TEE includes an authorization server to establish a trusted credential, a trust anchor, or a cryptographic key used to authenticate the authorization server.

5. The device of claim 1, wherein the first and second onboarding actions are performed as part of a plurality of onboarding actions performed on the device, the plurality of onboarding actions including: connectivity, discovery, trust establishment, service provisioning, and device configuration actions.

6. The device of claim 1, the operations comprising:
    initiating a first request of the first onboarding action to the first onboarding entity, wherein the command to perform the first onboarding action is provided in response to the first request; and
    initiating a second request of the second onboarding action to the second onboarding entity, wherein the additional command to perform the second onboarding action is provided in response to the second request.

7. The device of claim 1, wherein the first onboarding action and the second onboarding action are conducted in response to respective user authentications obtained via a three-way authorization.

8. the device of claim 7, wherein the three-way authorization includes:

obtaining approval from at least one user agent; and
obtaining approval from an authorization service on behalf of the respective onboarding entity.

9. The device of claim 8, wherein the approval from the authorization service is received in an OAuth2, OpenID-Connect, or Kerberos interaction obtained on behalf of the at least one user agent.

10. The device of claim 8, wherein the three-way authorization includes:
a request from the respective onboarding entity to the at least one user agent to obtain the approval, a response from the at least one user agent to indicate the approval, a request from the respective onboarding entity to the authorization service to obtain an authorization service token, and a response from the authorization service to indicate the authorization service token; and
wherein information to perform the respective onboarding action includes information based on the authorization service token and the response from the at least one user agent.

11. The device of claim 1, the operations comprising:
verifying the first user authorization, based on the command to perform the first onboarding action; and
verifying the second user authorization, based on the additional command to perform the second onboarding action.

12. A computer implemented method for user-authorized onboarding of a device in an Internet of Things (IoT) network, the method comprising:
obtaining a command from a first onboarding entity, the command to perform a first onboarding action on the device, wherein the first onboarding action is based on a first privilege level established from a first user authorization;
performing the first onboarding action on the device using the command;
obtaining an additional command from a second onboarding entity to perform a second onboarding action on the device, wherein the second onboarding action is based on a second privilege level established from a second user authorization, and wherein the second onboarding entity is distinct from the first onboarding entity; and
performing the second onboarding action on the device using the additional command;
wherein the first onboarding entity uses a first communication protocol, the second onboarding entity uses a second communication protocol, and the device uses a third communication protocol, and wherein the device causes data in the first communication protocol, data in the second communication protocol, and data in the third communication protocol to be converted into a standard communication protocol to provide multi-standard connectivity enabling the device, the first onboarding entity, and the second onboarding entity to communicate with each other.

13. The method of claim 12, wherein the first onboarding entity operates on a first onboarding device and the second onboarding entity operates on a second onboarding device.

14. The method of claim 13, wherein the first onboarding device operates with a first Trusted Execution Environment (TEE) and the second onboarding device operates with a second TEE distinct from the first TEE, and wherein at least one of the first TEE or the second TEE includes an authorization server to establish a trusted credential, a trust anchor, or a cryptographic key used to authenticate the authorization server.

15. The method of claim 12, wherein the first and second onboarding actions are performed as part of a plurality of onboarding actions performed on the device, the plurality of onboarding actions including: connectivity, discovery, trust establishment, service provisioning, and device configuration actions.

16. The method of claim 12, the method further comprising:
initiating a first request of the first onboarding action to the first onboarding entity, wherein the command to perform the first onboarding action is provided in response to the first request; and
initiating a second request of the second onboarding action to the second onboarding entity, wherein the additional command to perform the second onboarding action is provided in response to the second request.

17. The method of claim 12, wherein the first onboarding action and the second onboarding action are conducted in response to respective user authentications obtained via a three-way authorization, wherein the three-way authorization includes:
obtaining approval from at least one user agent; and
obtaining approval from an authorization service on behalf of the respective onboarding entity and wherein the approval from the authorization service is received in an OAuth2, OpenID-Connect, or Kerberos interaction obtained on behalf of the at least one user agent.

18. The method of claim 17, wherein the three-way authorization further includes:
a request from the respective onboarding device to the at least one user agent to obtain the approval, a response from the at least one user agent to indicate the approval, a request from the respective onboarding entity to the authorization service to obtain an authorization service token, and a response from the authorization service to indicate the authorization service token; and
wherein information to perform the respective onboarding action includes information based on the authorization service token and the response from the at least one user agent.

19. At least one non-transitory machine-readable medium including instructions that, when executed by a processor of a device, cause the processor to perform operations for user-authorized onboarding in an Internet of Things (IoT) network, the operations comprising:
obtaining a command from a first onboarding entity, the command to perform a first onboarding action on the device, wherein the first onboarding action is based on a first privilege level established from a first user authorization;
performing the first onboarding action on the device using the command;
obtaining an additional command from a second onboarding entity to perform a second onboarding action on the device, wherein the second onboarding action is based on a second privilege level established from a second user authorization, and wherein the second onboarding entity is distinct from the first onboarding entity; and
performing the second onboarding action on the device using the additional command;
wherein the first onboarding entity uses a first communication protocol, the second onboarding entity uses a second communication protocol, and the device uses a third communication protocol, and wherein the processor causes data in the first communication protocol, data in the second communication protocol, and data in the third communication protocol to be converted into a standard communication protocol to provide multi-standard connectivity enabling the device, the first onboarding entity, and the second onboarding entity to communicate with each other.

20. The at least one non-transitory machine-readable medium of claim 19, wherein the first onboarding entity operates on a first onboarding device and the second onboarding entity operates on a second onboarding device.

21. The at least one non-transitory machine-readable medium of claim 20, wherein the first onboarding device operates with a first Trusted Execution Environment (TEE) and the second onboarding device operates with a second TEE distinct from the first TEE, and wherein at least one of the first TEE or the second TEE includes an authorization server to establish a trusted credential, a trust anchor, or a cryptographic key used to authenticate the authorization server.

22. The at least one non-transitory machine-readable medium of claim 19, wherein the first and second onboarding actions are performed as part of a plurality of onboarding actions performed on the device, the plurality of onboarding actions including:
connectivity, discovery, trust establishment, service provisioning, and device configuration actions.

23. The at least one non-transitory machine-readable medium of claim 19, the operations comprising:
initiating a first request of the first onboarding action to the first onboarding entity, wherein the command to perform the first onboarding action is provided in response to the first request; and
initiating a second request of the second onboarding action to the second onboarding entity, wherein the additional command to perform the second onboarding action is provided in response to the second request.

24. The at least one non-transitory machine-readable medium of claim 19, wherein the first onboarding action and the second onboarding action are conducted in response to respective user authentications obtained via a three-way authorization, wherein the three-way authorization includes:
obtaining approval from at least one user agent; and
obtaining approval from an authorization service on behalf of the respective onboarding entity, and wherein the approval from the authorization service is received in an OAuth2, OpenID-Connect, or Kerberos interaction obtained on behalf of the at least one user agent.

25. The at least one non-transitory machine-readable medium of claim 24, wherein the three-way authorization further includes:
a request from the respective onboarding entity to the at least one user agent to obtain the approval, a response from the at least one user agent to indicate the approval, a request from the respective onboarding entity to the authorization service to obtain an authorization service token, and a response from the authorization service to indicate the authorization service token; and
wherein information to perform the respective onboarding action includes information based on the authorization service token and the response from the at least one user agent.

* * * * *

UNITED STATES PATENT AND TRADEMARK OFFICE
CERTIFICATE OF CORRECTION

PATENT NO. : 11,832,102 B2
APPLICATION NO. : 17/740608
DATED : November 28, 2023
INVENTOR(S) : Heldt-Sheller et al.

Page 1 of 1

It is certified that error appears in the above-identified patent and that said Letters Patent is hereby corrected as shown below:

On the Title Page

On page 2, in Column 2, under item (56) "Other Publications", Line 14, delete "Specfication" and insert --Specification-- therefor On page 2, in Column 2, under item (56) "Other Publications", Line 21, delete "JoT-Enabled" and insert --IoT-Enabled-- therefor On page 2, in Column 2, under item (56) "Other Publications", Line 21, delete "Compatibl"," and insert --Compatible",-- therefor Signed and Sealed this
Fourth Day of February, 2025

Coke Morgan Stewart
*Acting Director of the United States Patent and Trademark Office*